Patented Aug. 5, 1941

2,251,846

UNITED STATES PATENT OFFICE 2,251,846

ZINC CHROMATE

Reuben W. Leisy, Palmerton, Pa., assignor to The New Jersey Zinc Company, New York, N. Y., a corporation of New Jersey No Drawing. Application April 29, 1940,
Serial No. 332,267

7 Claims. (Cl. 23—56)

This invention relates to zinc chromate. It provides a basic zinc chromate of novel composition and superior properties for use in coating compositions and methods for producing such zinc chromate.

It has been proposed heretofore to employ zinc chromates as pigments, but the zinc chromates or "zinc yellows" heretofore available for such purpose have been characterized by a relatively low ratio of ZnO content to $CrO_3$ content in comparison with the basic zinc chromate of the present invention and have contained a relatively large proportion of water-soluble constituents which tend to produce blistering of paint films in which the pigment zinc chromate is incorporated. Thus, some of the zinc chromate content of such pigments has been water-soluble and the pigments have also contained a relatively large proportion of other water-soluble salts. Zinc chromate pigments available heretofore contain 36% to 40% ZnO, 36% to 48% $CrO_3$, and 18% to 34% water-soluble salts. These are, in addition to zinc chromate and other chromates, compounds of zinc, sodium, or potassium with radicals such as sulfate, which compounds result from the method of manufacture of the pigments, i. e., reaction of sodium or potassium dichromates with zinc sulfate or with zinc oxide plus sulfuric acid.

Zinc chromate pigments heretofore available are bright yellow in the dry state and tend to impart such a color to paint films in which they are employed. However, it has been necessary to employ expensive synthetic resin waterproof vehicles with these pigments in order to produce films that have resistance to blistering.

As a result of my investigations, I have produced a zinc chromate of novel composition and superior properties. The zinc chromate of my invention is basic and contains a higher ratio of zinc content to chromium content than do zinc chromates known heretofore. Thus, the basic zinc chromate of my invention has the formula $5ZnO.CrO_3.4H_2O$, which may also be written $ZnCrO_4.4Zn(OH)_2$, is substantially water-insoluble and manifests the fact that it is a chemical individual by several other unique chemical and physical properties including an X-ray pattern different from that of the so-called zinc chromate or zinc yellows heretofore available. Moreover, the X-ray pattern of ZnO is absent from the compound.

The compound of my invention may be identified by its X-ray pattern, which indicates the following interplanar spacings of the crystal lattice. In the table, the first column represents the distance in Ångstrom units between crystal planes from which X-rays are reflected with a relative intensity given in the second column. In the second column "$vs$" represents very strong intensity, "$s$" strong, "$m$" moderate, "$w$" weak, and "$f$" faint.

| Spacing | Relative intensities |
|---|---|
| $Å.$ units | |
| 4.19 | $m$ |
| 3.63 | $s$ |
| 3.25 | $w$ |
| 2.73 | $s$ |
| 2.55 | $vs$ |
| 2.18 | $m$ |
| 1.811 | $m$ |
| 1.754 | $w$ |
| 1.574 | $s$ |
| 1.522 | $m$ |
| 1.454 | $f$ |
| 1.371 | $f$ |
| 1.340 | $w$ |
| 1.276 | $f$ |
| 1.190 | $f$ |

The zinc chromate of my invention contains 5 mols of ZnO per mol of $CrO_3$. Its theoretical composition in parts by weight is 70.3% ZnO, 17.3% $CrO_3$, and 12.4% $H_2O$, and (as disclosed in detail hereinafter) it may be prepared in substantially pure state with a content of water-soluble salts that is less than 1/100 of the water-soluble salt content of heretofore customary zinc chromate pigments.

In its dry powdered state, the zinc chromate pigment of my invention is bright yellow, but it imparts to an oil film a yellowish-brown color, the shade of which varies substantially with the conditions prevailing during the manufacture of the pigment. As a pigment, therefore, the product finds its principal application in primer paints employed upon metals, such as iron, steel or galvanized iron, rather than in paints for top coats which ordinarily should be of more attractive color. However, the product has marked rust-protective properties and may be employed alone or mixed with other rust-preventive or rust-inhibiting pigments, such as zinc oxide, iron oxide, lead chromate, red lead, zinc dust and inerts, in cases where protection rather than ornamentation is the dominant consideration. It does not produce blistering of paint films in which it is incorporated even when such films are exposed to water. In contrast with heretofore customary zinc chromate pigments which require special vehicles to avoid blistering paint films, it can be used in ordinary linseed oil vehicles and in many other conventional vehicles to produce a water-resistant non-blistering metal-protective film.

My presently preferred method of producing the zinc chromate $5ZnO.CrO_3.4H_2O$ in accordance with the invention comprises direct treatment of zinc oxide in aqueous suspension with a theoretical amount of dissolved chromium trioxide, $CrO_3$, i. e., employing ZnO and $CrO_3$ in molal proportions of about 5:1. Such treatment at ordinary temperatures results in a rapid reaction; and if excessive amounts of water are not present the mixture sets to a cake that may be dried without filtering. After drying, the material requires only to be disintegrated to form a suitable pigment. The basic zinc chromate so prepared imparts a high consistency to paint per unit of pigment incorporated. If desired, however, the precipitation process can be so controlled that a fluid suspension rather than a stiff cake is obtained, this result being brought about by increasing the amount of water employed, by stirring longer or more violently, or by employing higher temperatures. In the case in which the fluid suspension is produced, the precipitate of zinc chromate must be separated from the mother liquor by clarification treatment, for example, by filtration.

The following is a practical example of the manufacture of the zinc chromate of my invention:

Example I

Five hundred kilograms of finely-divided zinc oxide are stirred into 5000 liters of water to form a slurry or suspension, and 125 kilograms of chromium trioxide $CrO_3$ dissolved in 150 liters of water are added rapidly to the suspension with agitation. The reaction is carried out at room temperature, say, 30° C. The reacting mass becomes a solid cake in about nine minutes. This cake is dried to a constant water content, and thereafter disintegrated. The temperature of drying may vary, but need not exceed about 100° C.

The resulting cake contains substantially 17.3% $CrO_3$, 70.4% ZnO, and 12.3% $H_2O$, thus corresponding very closely to the theoretical composition of 17.3% $CrO_3$, 70.3% ZnO, 12.4% $H_2O$. The content of water-soluble salts in the pigment is approximately 0.26% and this small content is harmless with respect to the production of blistering.

If desired, mixtures of the zinc chromate of my invention with zinc oxide can be obtained by using excess zinc oxide in the process described above, i. e., by employing more than five molal parts of zinc oxide to one molal part of $CrO_3$. Such mixtures of zinc oxide and the zinc chromate of my invention tend to form soft and porous paint films when incorporated in ordinary paint vehicles. Generally speaking, the greater the zinc oxide content the softer and more porous is the film. Consequently, for purposes where a soft and porous film is undesirable, I prefer to produce the zinc chromate pigment of the invention substantially free from uncombined zinc oxide.

The consistency of paints prepared with the pigment of my invention can be controlled by appropriate mechanical treatment of the pigment. Thus, the consistency of such paints ordinarily can be lowered by subjecting the pigment to grinding, densification or disintegration before incorporating it in the paint. Moreover, the consistency of paints prepared with the pigment of my invention may be lowered by carrying out the precipitation at an elevated temperature, say, 90° C., or by mechanical agitation of the precipitated pigment cake while it is still wet.

A zinc chromate of a composition in accordance with the present invention can also be made by reacting an alkali metal dichromate, say, sodium or potassium dichromate with zinc sulfate in the presence of zinc oxide, the $CrO_3$ content of the chromate being slightly in excess of that required to combine with the zinc present in the ratio of 1 mol of $CrO_3$ to 5 mols of ZnO. Thus, a product containing a large proportion of the basic zinc chromate of my invention can be obtained by operating as follows:

Example II

Thirty-two pounds of American process zinc oxide is put into a tank with approximately 50 gallons of filtered industrial water and is agitated for ten to fifteen minutes to insure thorough dispersion of the zinc oxide in the water. To the resulting slurry, 18.6 liters $ZnSO_4$ solution (110 grams per liter Zn) is added. The slurry is agitated vigorously during the time in which the zinc sulfate is added and agitation is continued for forty-five minutes.

At this point, the slurry is heated to a temperature of about 50° C. and 22.5 pounds of sodium dichromate ($Na_2Cr_2O_7.2H_2O$) dissolved in ten gallons of water added at the rate of one gallon per minute. The amount of sodium dichromate thus added is about 10% in excess of theoretical. Agitation of the slurry is continued during the period in which the sodium dichromate is added but thereafter is stopped and the slurry is allowed to stand overnight. Thereafter, the slurry is put through a filter press and the resulting cake, after drying at 100° C., is disintegrated to produce the pigment.

The composition of the product according to Example II is 65.7% ZnO, and 19.6% $CrO_3$. X-ray examination of the product indicated the presence of the compound $5ZnO.CrO_3.4H_2O$ together with other more water-soluble compounds.

I claim:

1. A basic zinc chromate having a crystal structure characterized by the following X-ray spacings:

| Spacing | Relative intensities |
|---|---|
| Å. units | |
| 4.19 | Moderate |
| 3.63 | Strong |
| 3.25 | Weak |
| 2.73 | Strong |
| 2.55 | Very strong |
| 2.18 | Moderate |
| 1.811 | Moderate |
| 1.754 | Weak |
| 1.574 | Strong |
| 1.522 | Moderate |
| 1.454 | Faint |
| 1.371 | Faint |
| 1.340 | Weak |
| 1.276 | Faint |
| 1.190 | Faint |

2. A pigment consisting essentially of a basic zinc chromate having the formula $$5ZnO.CrO_3.4H_2O$$

said pigment being substantially free of water-soluble salts.

3. A basic zinc chromate containing in parts by weight about 70.3% ZnO, about 17.3% $CrO_3$, and about 12.4% $H_2O$.

4. The process of making basic zinc chromate which comprises treating zinc oxide in aqueous suspension with a solution of chromium trioxide, the molal ratio of zinc oxide present to chromium trioxide present being not less than about 5:1.

5. The process of making basic zinc chromate which comprises treating zinc oxide in an aqueous suspension with dissolved chromium trioxide, the molal ratio of zinc oxide to chromium trioxide present being about 5:1.

6. The process of making basic zinc chromate which comprises treating zinc oxide in aqueous suspension with dissolved chromium trioxide, the amount of water present being such that the resulting compound $5ZnO.CrO_3.4H_2O$ sets to a firm moist cake, and drying said cake.

7. The process of making basic zinc chromate $5ZnO.CrO_3.4H_2O$ which comprises incorporating in a slurry of zinc oxide in aqueous zinc sulfate solution dissolved sodium dichromate, the $CrO_3$ content of which is slightly in excess of that required to combine with the zinc present in the ratio of 1 mol of $CrO_3$ per 5 mols of ZnO.

REUBEN W. LEISY.